April 17, 1934.  E. C. RANEY  1,955,091
INSTRUMENT ADJUSTMENT INDICATOR
Filed July 17, 1933
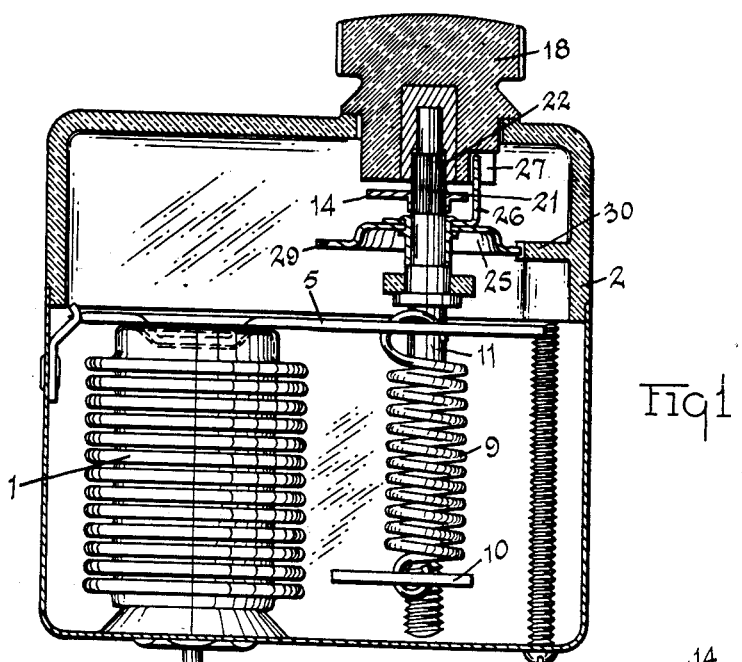
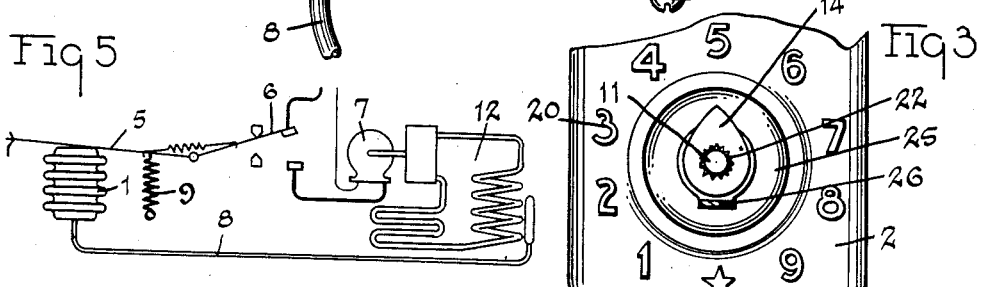
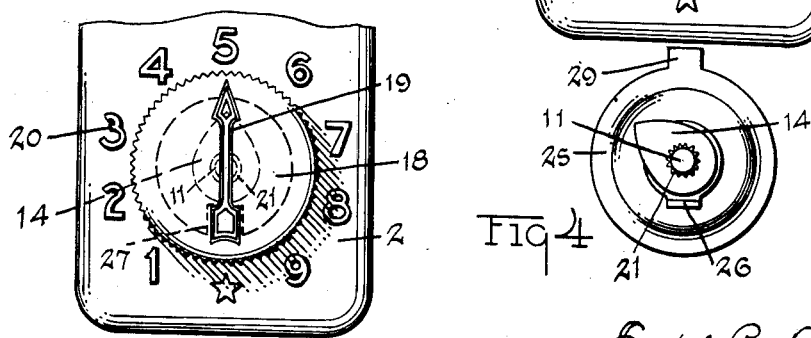
Inventor
Estel C. Raney
By Faust F. Crampton
Attorney Patented Apr. 17, 1934

1,955,091

UNITED STATES PATENT OFFICE 1,955,091

INSTRUMENT ADJUSTMENT INDICATOR

Estel C. Raney, Columbus, Ohio

Application July 17, 1933, Serial No. 680,689

12 Claims. (Cl. 200—83)

My invention has for its object to provide an indicator particularly applicable to indicate relative adjustments of adjustable parts of instruments of different forms and usable for a great variety of purposes. The invention is applicable to instruments that indicate operations or conditions existing in apparatuses or devices, and also to instruments that are used to control the apparatuses or devices.

As is well known, accuracy of indications or control of operations of apparatuses is commonly obtainable by associated instruments only after a number of sequential similar or different operations of the apparatuses under similar or different conditions. The invention may be used to indicate the extent of an adjustment previously made in an instrument as a guide to further adjustment of the instrument, either to secure accurate or desired responsiveness of the instrument to the operation of the apparatus or to secure the desired operation of the instrument to produce the desired operations of the apparatus. Also, as is well known in connection with many instruments that are calibrated to produce either accurate indication of the operations of an apparatus or to secure an accurate responsive operation of the apparatus to the adjustments of the instrument, extreme adjustment of such instruments destroys the calibration. The invention may thus be used to secure modified or magnified indications or modified operations of apparatuses with reference to a normal setting of the instrument in which calibration has been performed, and thus by its adjustment-indicating means the invention prevents the loss or destruction of the calibrated relations between the instrument and the apparatus.

Also, where instruments are altered from time to time to meet varying conditions or desired requirements of operation of the apparatus with which they may be associated, the extent of previous adjustments being registered by the use of my invention greatly aids in desired modified adjustments.

Thus the invention has for its object to maintain relatively adjustable parts of an instrument in a defined relation with respect to each other or with respect to a previously calibrated relation.

The invention may also be used in indicating instruments having manually adjustable members controlled or actuated by an apparatus to indicate limited operations of the apparatus or in controlling instruments having manually adjustable controlling members to limit the operations of an apparatus.

The invention is advantageously applicable to refrigerating apparatus for controlling the temperature producible by the apparatus within certain limits and wherein change in the location of the range of such limited adjustments may be safely made by a service man, since the alteration with respect to the normal or calibrated or factory setting of the refrigerator control is indicated, and uneconomic or injurious operations of the refrigerator that may occur by excess adjustment of the refrigerator control may be prevented.

The invention is advantageously applicable to a device adapted for controlling the temperature producible by refrigerating apparatus within a certain temperature range, and wherein it is possible to change the location of the temperature range so that a limited change in the location of the temperature range may be made by service men in the field to compensate for local operating conditions, without losing the original or factory calibration of the device.

Heretofore when service men made such temperature range adjustments in the field, the original calibrations were lost as there was no means of indicating the original calibration. This was often inconvenient as the device would have to be removed from the apparatus and re-calibrated by the use of special equipment in case it would be desirable to return the device to the original or any other operating temperature range.

Control or indicating devices having these features may be also used in connection with apparatus or mechanisms for producing temperatures within desired operating ranges in furnaces for heat treating articles, baking ovens, building or room heaters, incubators, air conditioning apparatus, humidifiers, etc., in electrically or thermically controlled instruments and apparatus of different forms where substantially precisional operation is desirable within limited ranges, and in valves of different forms for controlling gases and liquids, such as refrigerant expansion valves, etc.

The invention may be contained in structures that partake of different forms and may be varied in their details and used for different purposes and still embody the invention. To illustrate a practical application of the invention, I have selected an instrument embodying the invention for controlling the operations of the refrigerating apparatus as an example of the various structures and the details of such structures that contain the invention and shall describe the selected instrument hereinafter, it being understood that variations may be made and that certain features of my invention may be used to advantage without a corresponding use of other features of the invention and without departing from the spirit of the invention. The particular structure selected is shown in the accompanying drawing.

Fig. 1 illustrates a view of a section of a shell of a refrigerator control instrument, such parts of the instrument required to show an application of my invention, only, being presented in the figure. Fig. 2 is a top view of a part of the instrument and illustrates a manual control member for adjusting the instrument. Fig. 3 is a top view of the part of the instrument, when the control member has been removed. Fig. 4 illustrates a view of an indicating means connected to an adjustable part of the instrument which is operated by the manual control member shown in Fig. 2. Fig. 5 illustrates a diagram showing generally the connection of the instrument to a refrigerating apparatus.

In the particular form of invention selected as an example, a manually operated or user's adjustable control member is connected to and operates an adjustable part that may be adjusted by an expert or service man to confine the operation of the refrigerating apparatus within a desired range. The adjustable part has an indicator to indicate the extent of alteration of the adjustable part with reference to the calibrated responsiveness of the instrument or generally the location of the range of operations of the apparatus as determined by the limited adjustments of the control member. Thus the instrument may readily be reset or restored to the original calibrated settings of the instrument, or desired variations from the calibrated settings may be made.

As shown in the drawing, a suitable pressure member, responsive to the operations of the refrigerating apparatus, such as the bellows 1, may be located within the shell 2 to operate a lever 5 that actuates a switch 6. The switch 6 controls the circuit of the motor 7 that operates the refrigerating compressor. The bellows 1 may be connected by a suitable pipe 8 that leads to a part of the refrigerating apparatus which will alter the pressure in the pipe and the bellows substantially in accordance with the changes in temperature of the said part of the refrigerating apparatus in the manner well known in the art.

The pressure produced within the bellows is counteracted by a suitable spring, such as the spring 9, which is connected to the lever 5 and to a plate 10 and is adjusted by rotation of a rod 11. The plate 10 and the rod 11 are threaded, and the position of the plate 10 is varied by rotation of the rod 11, which adjusts the tension of the spring 9 and consequently adjusts the pressure in the bellows required to close and open the switch 6.

In order to indicate calibrated setting of the instrument and deviations therefrom, I have provided an indicating means which is associated with the rod. The indicating means consists of a pointer or needle 14 that may be connected to the upper end of the rod 11 to indicate the extent of rotation of the rod 11. If desired, a suitable scale may be formed on a member disposed in juxtaposed relation to the pointer 14 to indicate relative positions of the pointer.

The rod 11 is preferably enclosed within the shell 2 and a manually operative member 18, located exterior to the shell, has a hub adapted to be adjustably connected to the rod 11. The rod 11 forms a connecting part for connecting the manually operative member 18 to the parts of the instrument that are actuated as the refrigerating temperature changes. Preferably, the member 18 is provided with an indicating means to indicate any angular movement that may be made by the rotation of the member, such as the arrow 19, that may be formed on the top of the knob 18, and a suitable dial formed by indicating indicia, such as the numerals 20, located on the surface of the shell 2.

In order that the member or knob 18 may be readily connected to the rod 11 at any point with reference to the angular positions that it may be desired to establish between the pointer 14 and the arrow or dial pointer 19, the rod 11 is provided with a fluted surface 21 and the knob is provided with a fluted socket 22 which interfit. When the rod 11 has been adjusted by the service man to produce the desired temperature conditions, the member 18 may be readily connected in proper position to produce variation of the adjustment of the rod 11 within a prescribed range. Thus, the member or knob 18 within the limitations of its rotation may be operated to vary the adjustment of the rod 11, as made by the expert, to produce modified operations of the refrigerating apparatus by the user.

Limitations of the adjustment of the member or knob 18 are obtained through a disk 25 that is mounted on the rod 11. Preferably, the disk 25 is rotatably supported on the rod 11 and is fixedly connected to the rod 11 when the member 18 is connected to the rod. The disk 25 may be connected to the member 18 by means of a lug or finger 26 that is connected to the part 25 and protrudes preferably substantially parallel to the axis of the rod 11 and so as to engage in a recess 27 formed in the member 18. The disk 25 has a lug or tongue 29 that protrudes from the periphery of the disk, and the shell 2 is provided with a suitable projection 30 that is engaged by the tongue 29. The tongue 29 and the projection 30 have desired widths to limit the arc in which the tongue 29 may be moved, or the number of degrees that the member of knob 18 may be rotated. They produce the desired limitations of the adjustment of the instrument that may be made by rotation of the member 18.

Preferably the lug or finger 26 extends in the path of movement of an end portion of the pointer 14 and so as to be engaged thereby upon extreme adjustments of the rod 11 and consequently the lug 26 in conjunction with the pointer 14 operates to limit the adjustment that may be made by rotation of the rod when the knob is removed to maintain the setting of the instrument within the region of the more efficient operations of the refrigerating apparatus. Removal of the pointer 14, as well as the knob, enables alterations of adjustment to produce calibrated adjustment of the instrument. Reconnection of the pointer gives limited adjustment of location of the range by the service man, and in which the user may adjust the instrument by the operation of the knob.

Preferably, substantially exact calibration of the instrument to produce possibly the best average desirable operations of the apparatus is made and the pointer 14 is then placed on the rod 11 with the pointer 14 directed to a definite position, such as towards the numeral 5, as indicated in Fig. 3, which will thereafter indicate the calibrated setting of the instrument. The knob 18 is then placed on the rod 11, the arrow of the rod pointing to the same numeral which will position the pointer and arrow in parallel relation which is maintained during the adjustments of the user by manipulation of the knob 18. To lower the operating temperature range, the knob 18 is set so as to locate the arrow 19 to the original position, that is, towards the numeral 5 in the form of dial shown in the drawing. The knob 18 is then removed and the rod 11 and pointer 14 are moved the desired angular distance to the right. The knob is then returned, locating the arrow 19 in the original position, that is, so that the arrow extends towards the numeral 5. Thus the location of the range of operations of the apparatus within the limitations of adjustment by the operation of the knob is altered to produce lower refrigerating temperatures. To raise the refrigerating temperatures, the same order of procedure is followed, except that after removal of the member or knob 18, the pointer 14 and rod 11 are moved to the left. To determine the previous adjustment of the rod 11, the member 18 may be turned so that the arrow points to the numeral 5 and the position of the pointer 14 relative to the numeral indicates the previous setting of the instrument. If it is desired to restore the setting to normal, the rod is turned to locate the pointer 14 in the same definite position with reference to the shell that it had when the calibration was determined.

The same combination of related elements may be used in indicating instruments having an adjustable part that varies or magnifies the responsiveness of the instrument to the operations of the apparatus that operates the indicator.

The invention thus provides a means for accurately adjusting instruments of different kinds that are controlled by, or control the operations of, an apparatus, to produce the desired indications in the instrument with reference to the apparatus or control of the apparatus by the instrument. Thus desired control of operation of either the instrument, or the apparatus, or both, may be maintained within desired limitations.

I claim:

1. In a thermo-responsive switch, means for adjusting the temperature at which the switch operates within a substantially constant temperature range, an indicator for indicating the adjustment of the switch by the said means, means for raising and lowering the temperature range and means for indicating the adjustment of the last named means.

2. In a thermo-responsive switch, means for adjusting the switch to vary the temperature at which the switch is closed within substantially a constant temperature range, an indicator for indicating the adjustment of the said means, a second means for adjustably raising and lowering the temperature range and means for indicating the adjustment of the said second means.

3. In a refrigerator thermo-responsive switch, a rotatable member for varying the operating temperatures of the switch, an indicating member adjustably secured to the said rotatable member and operable to rotate the said rotatable member, a stop for limiting the rotation of the said indicating member, a second indicator member connected to the said rotatable member and operable to rotate the rotatable member and a means coacting with the said stop for limiting the rotation of the said second indicator member.

4. In a refrigerator thermo-responsive switch, a rotatable member for varying the operating temperatures of the switch, an indicating member adjustably secured to the said rotatable member and operable to rotate the said rotatable member, a stop for limiting the rotation of the said indicating members, a second indicator member connected to the said rotatable member and operable to rotate the rotatable member, and means for limiting the rotation of the said second indicator member.

5. In a thermo-responsive switch, a member having an indicating means, a rotatable adjusting means for adjusting the temperatures of switch operation, a stop means, the member having means for removably connecting the member to the adjusting means and to the stop means for rotating the stop means and the adjusting means with the member, an indicating member connected to the adjusting means, whereby the stop means operates to limit the rotation of the adjusting means to one rotative movement when the member is connected to the adjusting means and limit the adjusting means to another rotative movement when the member is disconnected from the adjusting means.

6. In a thermo-responsive switch, a member having an indicating means, a rotatable adjusting means for adjusting the temperatures of the switch operation, a rotatable part having a stop for limiting the rotation of the part, the member having means for removably connecting the member to the adjusting means and to the said rotatable part, the adjusting means having an indicator and means for engaging the said rotatable part, the said rotatable part operable to limit the rotation of the member and the adjusting means when connected to the adjusting means and to limit the rotation of the adjusting means when the member is removed from the adjusting means.

7. In a thermal responsive switch having a normal operating temperature range, indicating means for raising and lowering said temperature range, a second indicating means whereby the range of said first named indicating means may be raised or lowered a determinable amount.

8. In a thermal responsive switch, means for opening and closing the switch, indicating means for adjusting the operation of the said switch, means for raising or lowering the operating range a limited amount by movement of said indicating means, and a second indicating means whereby the range of the first indicating means may be raised or lowered a determined amount.

9. In a thermal responsive switch, means for adjusting the switch within a limited range including an indicating means for indicating the adjustment of the said means, a second indicating means whereby the relation of the said first adjusting means to the indicating means may be changed to raise or lower the operating range a determinable amount.

10. In a thermal responsive switch means for adjusting the operating range of the switch, an operating knob removably connected to the said adjusting means, a secondary adjusting means including an indicator whereby the knob may be removed and replaced in any one of a plurality of positions relative to the first named adjusting means to produce a limited range of adjustment of the operating range.

11. In a refrigerator control switch an adjustment means for raising and lowering the operating range of said switch, a knob embodying an indicator for turning said adjustment means and removably connected therewith, a second indicator attached to said adjustment means to indicate the normal position of the knob, means whereby the adjustment means and the knob may be re-connected at a determined angular position from normal and to produce a determined change of operating range.

12. In a thermal responsive switch, a rotatable adjusting means for adjusting the operating range of the switch, a knob removably connected to the said adjusting means, an indicator connected to the said adjusting means, a stop means coacting with the indicator for limiting the movement of the adjusting means to less than 360°, means for connecting said stop means to the said knob and the said adjusting means, so that they move together when the knob is connected to the adjusting means to limit the movement of the said knob to less than 360°.

ESTEL C. RANEY.